US008255894B2

(12) United States Patent
Nakagawa et al.

(10) Patent No.: US 8,255,894 B2
(45) Date of Patent: Aug. 28, 2012

(54) UPDATE DATA TRANSMISSION METHOD, COMPUTER PROGRAM FOR PRACTICING THE METHOD, HOST DEVICE AND FIRMWARE WRITING SYSTEM

(75) Inventors: Masayuki Nakagawa, Matsumoto (JP); Akio Takamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1103 days.

(21) Appl. No.: 11/881,687

(22) Filed: Jul. 27, 2007

(65) Prior Publication Data
US 2008/0028387 A1 Jan. 31, 2008

(30) Foreign Application Priority Data

Jul. 31, 2006 (JP) ................................. 2006-207558

(51) Int. Cl.
*G06F 9/44* (2006.01)
(52) U.S. Cl. .......................... 717/168; 717/171; 717/172
(58) Field of Classification Search ........................ None
See application file for complete search history.

(56) References Cited

U.S. PATENT DOCUMENTS

| 3,889,241 | A | * | 6/1975 | Cordi et al. .................. 711/109 |
| 3,988,719 | A | * | 10/1976 | Whitby et al. ................ 710/264 |
| 4,414,626 | A | * | 11/1983 | Arai et al. ...................... 710/34 |
| 4,875,155 | A | * | 10/1989 | Iskiyan et al. ................ 711/113 |
| 5,050,166 | A | * | 9/1991 | Cantoni et al. ............... 370/473 |
| 5,247,646 | A | * | 9/1993 | Osterlund et al. ............. 710/68 |
| 5,307,351 | A | * | 4/1994 | Webster ......................... 370/470 |
| 5,644,594 | A | | 7/1997 | Johnson et al. |
| 5,654,702 | A | * | 8/1997 | Ran ............................... 341/51 |
| 5,961,626 | A | * | 10/1999 | Harrison et al. .............. 710/305 |
| 6,279,153 | B1 | * | 8/2001 | Bi et al. ......................... 717/171 |
| 6,438,137 | B1 | * | 8/2002 | Turner et al. .................. 370/466 |
| 6,801,966 | B1 | * | 10/2004 | Khan .............................. 710/62 |
| 6,854,020 | B1 | | 2/2005 | Kamihara et al. |
| 6,925,467 | B2 | * | 8/2005 | Gu et al. ........................ 717/168 |
| 6,977,945 | B1 | * | 12/2005 | Noda et al. .................... 370/468 |

(Continued)

FOREIGN PATENT DOCUMENTS

EP    1 542 125    6/2005
(Continued)

OTHER PUBLICATIONS

J. Postel, et al., "File Transfer Protocol (FTP)", Oct. 1985, Network Working Group, Request for Comments: 959, [online], [retrieved on 2011-Mar. 31, 2011]. Retrieved from the Internet: <URL:http://tools.ietf.org/pdf/rfc959.pdf>, pp. 1-69.*

(Continued)

*Primary Examiner* — Thuy Dao
*Assistant Examiner* — Xi D Chen

(57) ABSTRACT

Time required sending firmware updates to a peripheral device, e.g., a printer, is shortened without changing the communication speed. A server sequentially reads records of source data in a first format, deletes blocks of consecutive blank data that are contained in object data in records of the first format and are longer than management data in a second format, segments the object data before and after the blanks, connects the object data in records of the first format into units of a certain length, generates management data for each of the segmented object data and connected object data to produce target records in the second format, and sends the update data composed of the target records of the second format to the printer. Records of the first format written in ASCII code are binary converted, and binary records in the second format are sent to the printer.

20 Claims, 6 Drawing Sheets

U.S. PATENT DOCUMENTS

| | | | |
|---|---|---|---|
| 6,988,101 B2 * | 1/2006 | Ham et al. | 1/1 |
| 6,996,819 B1 * | 2/2006 | Alanis | 717/173 |
| 7,107,397 B2 * | 9/2006 | Dahman et al. | 711/113 |
| 7,171,659 B2 * | 1/2007 | Becker et al. | 717/171 |
| 7,260,651 B2 * | 8/2007 | Parrella et al. | 709/247 |
| 7,280,955 B2 * | 10/2007 | Martin | 717/171 |
| 7,525,994 B2 * | 4/2009 | Scholte | 370/474 |
| 7,587,463 B2 * | 9/2009 | Sugita | 709/208 |
| 7,650,510 B2 * | 1/2010 | Sullivan | 713/189 |
| 7,702,940 B2 * | 4/2010 | Van Gassel et al. | 713/324 |
| 7,779,404 B2 * | 8/2010 | Movassaghi et al. | 717/168 |
| 7,788,647 B2 * | 8/2010 | Martin et al. | 717/171 |
| 7,996,828 B2 * | 8/2011 | Massmann et al. | 717/168 |
| 8,001,539 B2 * | 8/2011 | Mitchell | 717/168 |
| 8,099,727 B2 * | 1/2012 | Bahat et al. | 717/172 |
| 8,156,071 B2 * | 4/2012 | Gu et al. | 717/168 |
| 2003/0163429 A1 * | 8/2003 | Humbeutel et al. | 705/51 |
| 2003/0210711 A1 * | 11/2003 | Faust et al. | 370/474 |
| 2004/0031030 A1 * | 2/2004 | Kidder et al. | 717/172 |
| 2005/0036348 A1 | 2/2005 | Aoyama | |
| 2007/0028226 A1 * | 2/2007 | Chen et al. | 717/168 |
| 2008/0028387 A1 * | 1/2008 | Nakagawa et al. | 717/172 |
| 2008/0052699 A1 * | 2/2008 | Baker et al. | 717/168 |
| 2008/0163189 A1 * | 7/2008 | Chen et al. | 717/168 |
| 2008/0313282 A1 * | 12/2008 | Warila et al. | 717/172 |
| 2009/0138872 A1 * | 5/2009 | Fuchs et al. | 717/172 |

FOREIGN PATENT DOCUMENTS

| | | |
|---|---|---|
| GB | 2 349 044 | 10/2000 |
| JP | 06-242894 | 9/1994 |
| JP | 11-212908 | 8/1999 |
| JP | 2000-134230 A | 5/2000 |
| JP | 2005-63050 A | 3/2005 |

OTHER PUBLICATIONS

Ying Bai, "The Windows Serial Port Programming Handbook", 2005, Auerbach Publications, pp. 1-104.*

David D. Clark, et al., "Architectural Considerations for a New Generation of Protocols", 1990, ACM, [onlie], [retrieved on Mar. 30, 2011]. Retrieved from the internet: <URL:http://citeseerx.ist.psu.edu/viewdoc/download?doi=10.1.1.63.5125&rep=rep1&type=pdf>, pp. 200-208.*

Luo, "Using FIFOs to Realize the High Rates Data Communication between USB and DSP", 2009 First International Workshop on Education Technology and Computer Science, IEEE; [retrieved on May 4, 2012]; Retrieved from Internet <URL:http://ieeexplore.ieee.org/stamp/stamp.jsp?tp=&arnumber=4959474>;pp. 989-992.*

Mckusick, et al., "A Fast File System for UNIX", 1984, ACM; [retrieved on May 4, 2012]; Retrieved from Internet <URL:http://dl.acm.org/citation.cfm?id=990>;pp. 181-197.*

Yim, et al., "A Fast Start-Up Technique for Flash Memory Based Computing Systems", 2005, ACM; [retrieved on May 4, 2012]; Retrieved from Internet <URL:http://dl.acm.org/citation.cfm?id=1066871>;pp. 843-849.*

* cited by examiner

UPDATE DATA TRANSMISSION METHOD, COMPUTER PROGRAM FOR PRACTICING THE METHOD, HOST DEVICE AND FIRMWARE WRITING SYSTEM

BACKGROUND OF THE INVENTION

1. Field of Invention

The present invention relates to an update data transmission method for sending data from a computer to a peripheral device for updating the firmware (program) in the peripheral device, and to an update data transmission program for causing a computer to execute the update data transmission method. The invention also relates to a firmware writing system including a computer that sends firmware update data to a peripheral device and the peripheral device that rewrites its firmware based on firmware update data received from the computer. The invention also relates to a host device using the firmware writing system and method.

2. Description of Related Art

Printers and other modern peripheral devices commonly store the device's firmware in flash memory so that the firmware can be easily updated. JP-A-2005-63050, for example, teaches a method of updating firmware by receiving data for updating a control program from an external device, and using a writing program stored in a second storage area in flash memory to update the control program stored in a first storage area in flash memory with the received update data. If the peripheral device is connected to a network, the firmware update data can be received from the computer over the network to update the firmware.

The computer sends the firmware update data for the peripheral device to the peripheral device using a known format such as the Motorola (R) S3 format. The Motorola S3 format writes the compiled source code written in a programming language in a hexadecimal text file, and includes a management data part containing the data storage address, for example, and the object data (see FIG. 2A). The Motorola S3 format uses two letters to express one byte of data. The peripheral device converts the received text data from the Motorola S3 format (referred to below as the S3 ASCII format) to binary data, and writes the binary data to flash memory. The update data is thus written in a prescribed format such as the Motorola S3 format, and is sent and received in record (packet) units.

JP-A-2000-134230 teaches a method of generating the transmission packets by segmenting the available storage area in RAM, for example, into a header area where the header is stored and a data area where the data is stored, and linking the header stored in the header area to the data stored in the data area by a hardware operation that outputs the transmission packets.

Increased functionality in the peripheral devices has also increased the size of the firmware, which has increased the number of records (the number of data units) that are sent and received when the firmware is updated. Sending and receiving large amounts of update data is not particularly a problem when a high speed communication interface such as USB, a parallel interface, or Ethernet (R) connects the computer and the peripheral device, but sending the update data can take a long time if an RS-232C or other low speed communication interface is used. Sending 6 MB of data at 19,200 bps, for example, takes approximately 45 minutes, and at 9600 bps takes approximately 90 minutes. In addition, the peripheral device usually cannot be used while the firmware update data is being received, and completing the data transmission in the shortest possible time is therefore particularly desirable in any situation where the peripheral devices are normally used 24 hours a day.

JP-A-H11-212908 addresses this problem by teaching an interface box for temporarily storing in memory data received from a computer using an RS-232C (9600 bps, for example) interface, and then transferring the data from memory to a mobile information device using a faster (such as 50,000 bps) serial or parallel interface. The mobile information device can thus reduce the time that is required for data communication.

The communication time can also be shortened by reducing the amount of transferred data. JP-A-H06-242894, for example, teaches a method of counting the number of consecutive values representing a blank character (0x20) in the print data to be sent to the printer, and if this number is greater than or equal to a prescribed reference value, sending control data instead of the consecutive blank characters to move the printing position (print head) of the printer in one step a distance equal to the number of consecutive blanks.

A problem with the technology taught in JP-A-H11-212908, however, is that in addition to requiring an interface box, the peripheral device must also be made compatible with the interface box, and the interface box is thus lacking in general applicability. Furthermore, because the data transfer rate between the computer and the interface box is the bottleneck, the update data communication time is not shortened from the perspective of the overall system.

SUMMARY OF THE INVENTION

An update data transmission method, and a computer program for practicing the method, a host device, and a firmware writing system according to the present invention enable shortening the communication time when transferring firmware update data from a host device to a peripheral device without changing the data transfer rate.

The update data transmission method according to a first aspect of the invention is used by a host device for transmitting firmware update data to a peripheral device. The method comprises steps of: (a) sequentially reading, as source records having a first format including source object data and source management data, data records of the firmware update data to be transmitted; (b) converting the source records into target records having a second format including target object data and target management data generated therefor; and (c) sending the target records to the peripheral device; wherein step (b) comprises: (b1) arranging the source object data of the source records in a sequence of object data blocks of a predetermined maximum length by appending the source object data of a respective source record to the source object data of one or more preceding source records and beginning the next object data block once the previous object data block has reached the predetermined maximum length; (b2) checking, while performing step (b1), if there is any block of consecutive blanks among the source object data that is longer than the target management data in the target records, and, if a block is detected, executing step (b1) up to the source object data that immediately precedes the detected block, and beginning the next object data block with the source object data immediately following the detected block, such that a detected block is not included in an object data block and the source object data immediately preceding such block and those immediately following it are arranged in two consecutive subsequent ones of the object data blocks; and (b3) generating target management data for each of the object data blocks, and generating a target record including the respective object data block as the target object data and the target management data generated therefor.

A host device having a computer program for transmitting firmware update data from the host device to a peripheral device comprising: (a) means for sequentially reading, as source records having a first format including source object data and source management data, data records of the firmware update data to be transmitted; (b) means for converting the source records into target records having a second format including target object data and target management data generated therefor; and (c) means for sending the target records to the peripheral device; wherein the means for converting the source records into target records initiates the execution of the computer program including the steps of: (b1) arranging the source object data of the source records in a sequence of object data blocks of a predetermined maximum length by appending the source object data of a respective source record to the source object data of one or more preceding source records and beginning the next object data block once the previous object data block has reached the predetermined maximum length; (b2) checking while performing step (b1), if there is any block of consecutive blanks among the source object data that is longer than the target management data in the target records, and, if a block is detected, executing step (b1) up to the source object data that immediately precedes the detected block, and beginning the next object data block with the source object data immediately following the detected block, such that a detected block is not included in an object data block and the source object data immediately preceding such block and those immediately following it are arranged in two consecutive subsequent ones of the object data blocks; and (b3) generating target management data for each of the object data blocks, and generating a target record including the respective object data block as the target object data and the target management data generated therefor.

Concatenating sets of object data of plural source records to one set of object data of a target record reduces the number of target records (transmission data units) as compared to the number of source records, and thus also reduces the amount of management data required for the records. This also reduces the total amount of transmission data and thereby shortens the data communication time. Furthermore, by applying an upper limit to the length of the concatenated object data, communication errors can be detected and data transmission can be retried more quickly, avoiding unnecessary data communication. The total amount of data to be transmitted is further reduced by deleting consecutive blocks of blank data exceeding the length of the management data in the target records. Note that the term "blank" as used in the context of this invention refers to a particular data value for initializing and erasing flash memory. In other words, when a flash memory in initialized or data therein is erased, a particular value, i.e., a "blank", is actually written into all or selected ones of the memory cells. Typically, ASCII value 0xFF is used as this particular value. For the present invention it is not critical which value is used. However, it is important to note that "blank" as used herein represents the same value as that used for initializing and erasing the non-volatile memory that stores the firmware data in the peripheral device, e.g., a printer.

Preferably, a first format (format of the source records) is an ASCII code format, and a second format (format of the target records) is a binary format. The total amount of transmission data can be approximately halved by converting ASCII to binary, and the data communication time can therefore also be approximately halved. The binary conversion does not need to be done on the peripheral device side as in the related art, and the processor load of the firmware updating process is reduced on the peripheral device side. Because the CPU used in the peripheral device is generally less powerful than the CPU used by the computer, reducing the processor load on the peripheral device improves the performance of the firmware updating process of the overall system including both the host computer and the peripheral device.

Further preferably, the upper limit of the length (also referred to as block data length) of the concatenated object data (also referred to as object data block) is less than or equal to the length of the data writing unit of the flash memory that stores the peripheral device firmware. If the block data length is greater than the length of the data writing unit (the sector capacity), the peripheral device may need to segment the object data into the length of the data writing unit. This increases the processor load for the peripheral device and thus reduces the performance of the firmware writing process for the overall system.

Yet further preferably, the upper limit of the block data length is set according to the type of interface to which the peripheral device is connected. Yet further preferably, the communication speed with the peripheral device is measured and the upper limit is set according to the measured communication speed. By changing the block data length according to the communication interface or the communication speed, the data can be transmitted more efficiently and the communication time can be shortened.

The update data transmission method of the invention is preferably contained in a computer program which may be stored in a recording medium.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
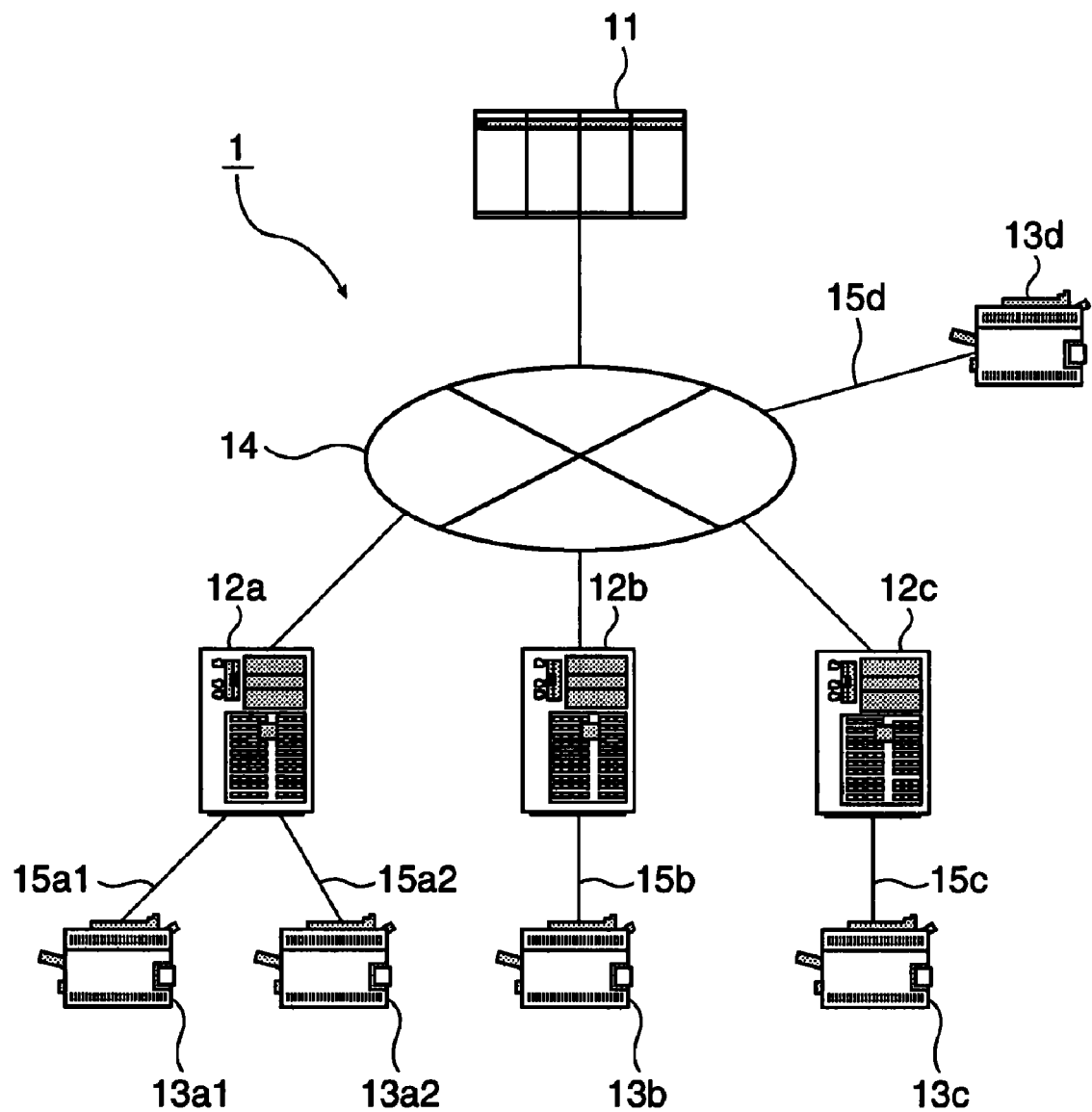
FIG. 1 is a schematic block diagram of the firmware writing system according to the present invention.

Preferred embodiments of the present invention are described below with reference to the accompanying figures.
System Configuration A firmware writing system 1 according to an embodiment of the invention includes a host computer 11, a plurality of servers 12a, 12b, 12c, and a plurality of peripheral devices, printers 13a1, 13a2, 13b, 13c, and 13d for example.

The host computer 11 and the servers 12a to 12c are connected over a network 14. Printers 13a1 and 13a2 are connected to the server 12a by interfaces 15a1 and 15a2, respectively. The printer 13b is connected to server 12b by an interface 15b, and the printer 13c is connected to the server 12c by an interface 15c. The printer 13d is connected through the interface 15d to the network 14, and can be controlled by the host computer 11 and the servers 12a to 12c that are also connected to the network 14.

The servers 12a to 12c may be common personal computers or dedicated information processing devices such as POS terminals.

The network 14 can be a local area network (LAN) such as an Ethernet network, or a wide-area network (WAN) such as a dedicated line, the Internet, a virtual private network (VPN). If the network 14 is a WAN, the host computer 11 can instruct the remote servers 12a to 12c to update the firmware of the connected printers 13a1 to 13c. The host computer 11 can also instruct a printer 13d connected directly to the network 14 to update the firmware. A single host computer 11 can thus control updating the firmware in a plurality of remote printers 13a1 to 13d.

The interfaces 15a1 to 15c can be serial interfaces such as RS-232C (14.4 kbps maximum data transfer rate) or USB (60 Mbps maximum data transfer rate with USB 2.0) interfaces, or parallel interfaces such as SCSI (320 Mbps maximum data transfer rate).

The servers 12a to 12c can be connected to the host computer 11 over the network 14 using different data transfer rates. The printers 13a1 and 13a2 can also be connected to the server 12a at different data transfer rates.

The host computer 11 in this firmware writing system 1 sends the firmware update data to the printers 13a1 to 13d, and the individual printers update their own firmware accordingly. Alternatively, the servers 12a to 12c can send the firmware update data to the connected printers 13a1 to 13c, and the individual printers update their own firmware accordingly. The invention is further described below using the server 12b (computer) and the printer 13b (peripheral device) as example of a firmware writing system according to the present invention to describe the process for updating the firmware in the printer 13b.

Motorola S3 Format

The firmware of printer 13b is written in a programming language and the source code is compiled and supplied to the server 12b in the Motorola S3 format, which is a hexadecimal text format. The firmware source code could be supplied to the server 12b, and the server 12b could convert the source code to the Motorola S3 format.

Figure 2A:
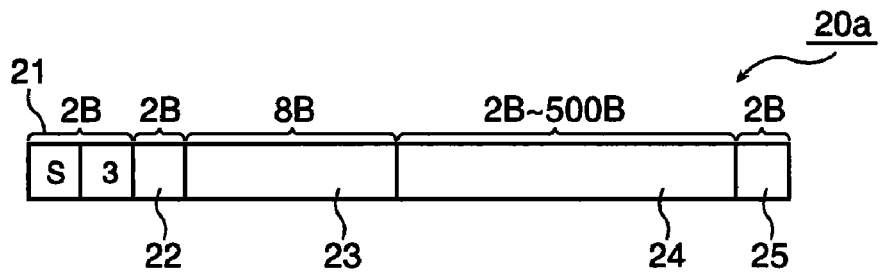
FIG. 2 describes the format of the data units of the update data.

Referring to FIG. 2A, one record 20a (data unit) in the Motorola S3 format includes a type field 21, a data length field 22, an address field 23, a data field 24, and a checksum field 25.

The type field 21 is a value denoting the Motorola S format type (record type), and is 2 bytes long. This aspect of the invention uses the S3 format, but other Motorola S formats include the S1 and S2 formats. Types S7 to S9 are also defined as type S1 to S3 terminators.

The data length field 22 is a 2-byte value indicating the amount of data that follows, that is, the record length.

The address field 23 is an 8-byte value denoting the address where the first byte of the data packed in the data field 24 is stored in the flash memory 132 of the printer 13b.

The data field 24 is from 2 to 500 bytes long, and contains the actual data (object data) to be written to the flash memory 132 of the printer 13b.

The checksum field 25 contains a 2 byte checksum that is calculated from the byte values in the data length field 22, the address field 23, and the data field 24.

The data other than the object data in the data field 24, that is, the record type, record length, address, and checksum values are referred to below as "management data", and the object data and the management data together constitute one record (data unit).

Server Arrangement

Figure 3:
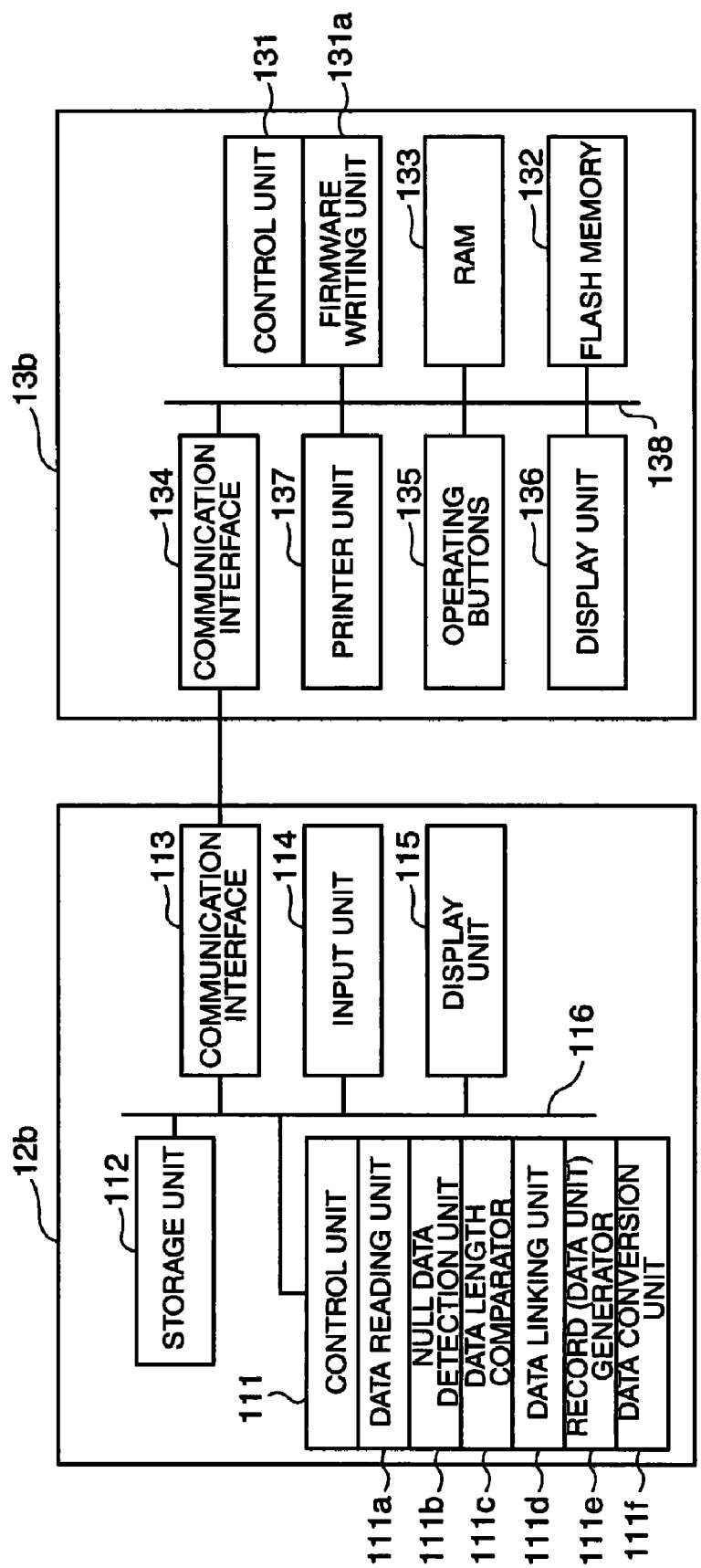
FIG. 3 is a control block diagram of the server and the printer.

As shown in FIG. 3 the server 12b has a control unit (CPU) 111, a storage unit 112, a communication interface 113, an input unit 114, and a display unit 115 connected to each other over a bus 116.

The control unit 111 reads programs stored in the storage unit 112 as needed to control the server 12b. The control unit 111 includes a data reading unit 111a, a blank data detection unit 111b, a data length comparator 111c, a data appending unit 111d, a record (data unit) generator 111e, and a data conversion unit 111f.

The data reading unit 111a sequentially reads each record (source record) of the firmware update data (Motorola S3 format) for the printer 13b from the storage unit 112 in response to a firmware updating command from the host computer 11 or from the operator of the server 12b. The update data can be provided by the operator on the server 12b, or the update data can be received from the host computer 11 over the network 14.

The blank data detection unit 111b determines if a block of consecutive blanks (0xFF) is contained in the object data of the source record read by the data reading unit 111a whose length is equal to or longer than predetermined number.

The data appending unit 111d forms object data blocks by sequentially appending object data of the currently processed source record to those of one or more previously processed source records until a predetermined maximum allowable data length is reached. The data length comparator 111c compares the actual length (block data length) of the currently formed object data block with the predetermined maximum allowable value of this data length. As soon as one object data block has reached its maximum allowable block data length any remaining object data of the currently processed source record from the begin of the next object data block to which object data of subsequent source records will then be appended.

If, during this appending process, the blank data detection unit 111b detects such block of consecutive blanks whose length is no less than the predetermined number, the data appending unit 111d appends the object data of a first segment, namely that preceding the detected block, until the maximum allowable data length of the currently formed object data block is reached, whereas a new object data block is started with a second segment including the object data that follow the detected block. The detected block of blanks is deleted, i.e., these blanks are not appended to any object data block. The blank data can be deleted because erasing the flash memory 132 stores blanks (0xFF).

The record generator 111e adds management data to each thus formed object data block the added management data corresponding to the respective object data block formed by the data appending unit 111d. Each object data block with the corresponding management data added to it is output as a new record 20c (first alternative) or 20d (second alternative). More specifically, the record generator 111e determines the record length based on the data length of the object data block, specifies the address where the first byte of the object data block is stored, and calculates a checksum.

Figure 2B:
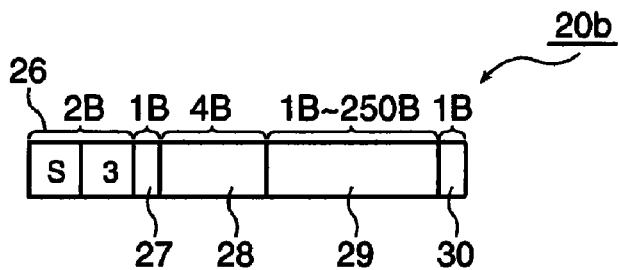
Figure 2C:
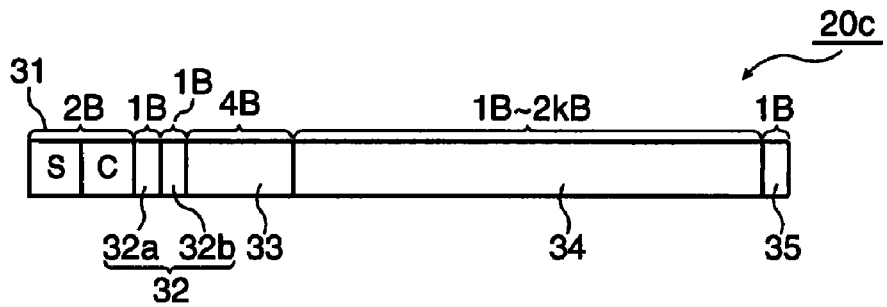
Figure 2D:
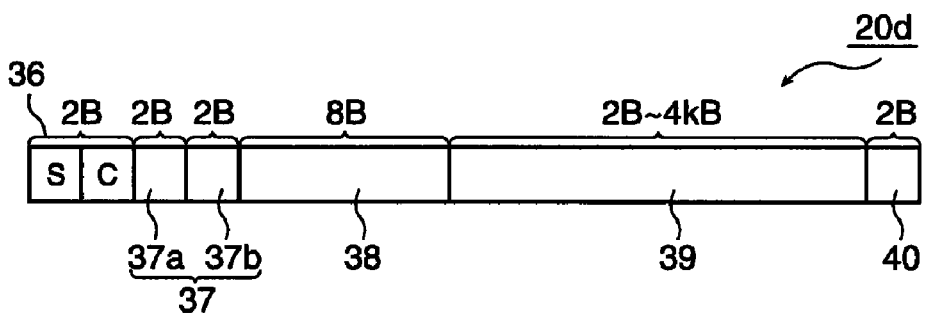

In on embodiment of the invention (first alternative), the data conversion unit 111f converts the update data composed of the record 20a read by the data reading unit 111a from the ASCII format to a binary format record 20b shown in FIG. 2B. In this embodiment, the record generator 111e generates new records as records 20c from records 20b as source record.

In another embodiment of the invention (second alternative), the record generator 111e generates new records as records 20d from records 20a as source record and the data conversion unit 111f converts the records 20d from the ASCII format to a binary format.

The storage unit 112 functions as working memory for the control unit 111 and as the update data storage area, and can include local memory and cache memory. The storage unit 112 may be one that allows reading and writing data electrically, magnetically, or optically, and may be a semiconductor storage device (hard disk and memory), magnetic tape, a floppy disk, a magneto-optical disc, or an optical disc, for example.

The communication interface 113 could be a serial interface or a parallel interface for connecting the printer 13b. The communication interface 113 also includes an Ethernet adapter or modem for connecting to the host computer 11 over the network 14.

The input unit 114 is used for operator input, and includes a keyboard and a pointing device.

The display unit 115 can be an LCD panel or other type of monitor for displaying a screen for getting data input from the operator, and displaying the results of the operations of server 12b and progress reports.

Printer Arrangement

As also shown in FIG. 3 the printer 13b includes primarily a control unit (CPU) 131, a flash memory 132, a RAM 133, a communication interface 134, operating buttons 135, a display unit 136, and a printer unit 137 connected to a common bus 138.

The control unit 131 reads and executes programs and firmware from flash memory 132 as needed and thus controls the printer 13b. The control unit 131 includes a firmware writing unit 131a that reads and executes a firmware writing program to update the firmware in response to a command from the server 12b or when firmware update data is received.

The flash memory 132 is a nonvolatile memory that allows erasing and overwriting data in batches in units of a sector (such as 64 KB units).

The RAM 133 functions as local memory and cache memory used by the control unit 131 when running programs.

The communication interface 134 is a RS-232C, USB, or other serial interface, or a SCSI or other parallel interface for connecting to the server 12b.

The operating buttons 135 are for getting user input from the operator.

The display unit 136 can be an LCD or LED panel or other type of monitor for displaying a screen for getting data input from the operator, and displaying the results of operations of printer 13b, progress reports, and status reports.

The printer unit 137 includes a print head and paper transportation mechanism, and prints on the recording paper as controlled by the control unit 131.

Update Data Transmission Process

The process of sending the update data for updating the firmware stored in the flash memory 132 of the printer 13b from the server 12b to the printer 13b is described next with reference to the flow chart in FIG. 4.

The server 12b first executes a preprocessing step (S101) before starting the firmware update data transmission process. This includes, for example, the control unit 111 stopping a resident print spooler, if any.

The data reading unit 111a then sequentially reads the firmware update data for the printer 13b in the Motorola S3 format, one record at a time, from the storage unit 112 (S102). When the S7 record denoting the end of the update data is read (S103 returns Yes), the data reading unit 111a converts the records from the read S3 format to a binary format as shown in FIG. 2B (S104).

ASCII codes 0x30 ("0") to 0x39 ("9") and 0x41 ("A") to 0x46 ("F") are respectively converted to 0x0 to 0x9 and 0xA to 0xF by binary conversion. Converting from ASCII to binary code thus reduces the amount of data by half. As shown in FIG. 2, the data in fields 22 to 24 (but not the type field 21) is binary converted and the checksum is calculated based on the binary values for fields 22 to 24. As shown in FIG. 2B, therefore, the binary record 20b includes 8 bytes of management data including a 2-byte type field 26, a 1-byte data length field 27, a 4-byte address field 28, and a 1-byte checksum field 30, and a maximum 250-byte data field 29. The data format shown in FIG. 2A is referred to below as the S3 ASCII format, and the format shown in FIG. 2B is referred to as the S3 binary format.

As the update data records are read, the blank data detection unit 111b detects for each record if the object data in the data field 29 contains a block of 10 or more consecutive blank bytes (bytes of value 0xFF) (S105). Detecting a block of consecutive blanks is not limited to each record, and the presence of consecutive blanks in the object data of consecutive records is preferably detected. For example, if the last five bytes in the object data of one record are blanks and the first five bytes in the object data of the next record are also blanks, a block of ten or more consecutive blanks is preferably detected.

If a block of 10 or more consecutive blank bytes is not detected (S105 returns No), the data length comparator 111c determines if the block data length, i.e., the data length of the currently formed object data block, exceeds the maximum block data length (2 KB in this embodiment of the invention) (S106). More specifically, the data length comparator 111c determines if the lengths of the object data read to that point exceeds the maximum block data length. If the block data length does not exceed its maximum allowable value of 2 KB in this example (S106 returns No), the data appending unit 111d appends the data that was just read (S107) to those of previously read records in the currently formed object data block.

The maximum block data length was experimentally determined by measuring the time required to transmit data of a predetermined size using the record length as a parameter to find the effective, efficient record length affording a short transmission time and a record length that is not too long. Simply increasing the record length does not effectively shorten the transmission time, and is conversely inefficient because more time is required for error checking during communication. The record length is also preferably less than or equal to the sector size of the flash memory 132 used in the printer 13b. If an RS-232C or USB serial interface were used as the communication interfaces 113 and 134, for example, tests showed that the maximum block data length is preferably about 2 KB.

In this case the predetermined maximum block data lengths are preferably stored in a lookup table on the server 12b for each interface or data communication rate so that the maximum block data length can be selected as needed. Alternatively, the communication speed between the server 12b and the printer 13b can be measured, and the maximum block data length can be selected from the lookup table based on the measured speed. The communication speed can be measured by, for example, sending a known amount of data from the server 12b to the printer 13b, the printer 13b reporting to the server 12b when reception ends, and the server 12b then calculating the time from the start of transmission until when the end of reception report is received.

Whether the update data has been read to the end is then determined (S108). More specifically, whether the terminating S7 record was read is determined, and steps S105 to S108 repeat until the terminator record is read.

This process continues to append object data until the block data length reaches 2 KB. The record 20b in the S3 binary format shown in FIG. 2B is then converted to a record 20c in the SC binary format shown in FIG. 2C. Note that this SC binary format is a proprietary data format of Seiko Epson Corporation, and includes a 2-byte type field 31 (SC), a 2-byte data length field 32 including a high byte 32a and a low byte 32b, a 4-byte address field 33, a data field 34 of 2-KB at maximum, and a 1-byte checksum field 35. The management data (fields 32, 33, and 35) is generated based on the object data block. The terminator of the Motorola S3 format, that is, the S7 record, is converted to an SX record as the terminator of the SC format.

If a block of 10 or more bytes of consecutive blanks is detected in step S105 (S105 returns Yes), the data appending unit 111d deletes the consecutive blanks, and appends the object data preceding the consecutive blanks to the object data block being formed (S109). The object data following the deleted blanks is contained in the next object data block. The record generator 111e then generates the management data corresponding to the object data block, adds the management data to the object data block, and outputs an SC binary format record 20c (S110).

If the block data length in step S106 exceeds 2 KB (S106 returns Yes), the record generator 111e generates the management data corresponding to the object data block, adds the management data to the object data block, and outputs an SC binary format record 20c (S110). Though not shown in the figures, a new record is also created if two records are determined to not be consecutive based on the addresses specified in the address fields. The records are thus created so that the object data contained in one record is always consecutive.

If step S108 determines that the update data has been read to the end (S108 returns Yes), the server 12b prepares to communicate with the printer 13b (S111). The server 12b thus opens the interface 15b and determines if the communication channel is open (whether it is busy or not). The server 12b also gets the model identifier and firmware version of the printer 13b, and confirms if the connected printer 13b is a printer to which the update data should be sent. Once the communication channel is open, the server 12b sends the SC binary format record 20c sequentially, record by record, to the printer 13b (S112).

When the server 12b finishes sending the update data, the server 12b waits until the printer 13b has finished the firmware updating process and has then sent the firmware version to the server, whereupon the server can determine if the firmware was correctly updated (S113).

The total number of records is thus reduced by creating new records 20c by concatenating the object data of multiple records so that the maximum block data length does not exceed 2 KB. The amount of management data required for each record is decreased by decreasing the number of records, the total amount of data to be transmitted is thus decreased, and the communication time required to send the firmware update data to the printer 13d is therefore shortened.

Furthermore, deleting blocks of consecutive blanks that are longer than the length of the management data also reduces the total amount of transmission data. The number of records could increase and the amount of management data could increase as a result of creating a new record 20c before the length of the connected object data blocks reaches the maximum block data length, but the data can be reduced by at least one byte per record because blocks of consecutive blanks exceeding the length of the management data are deleted.

This embodiment of the invention runs the binary conversion process, blank detection process, and object data linking process after reading all S3 ASCII format update data, but these processes can be run each time one record is read.

Firmware Writing Process

Figure 5:
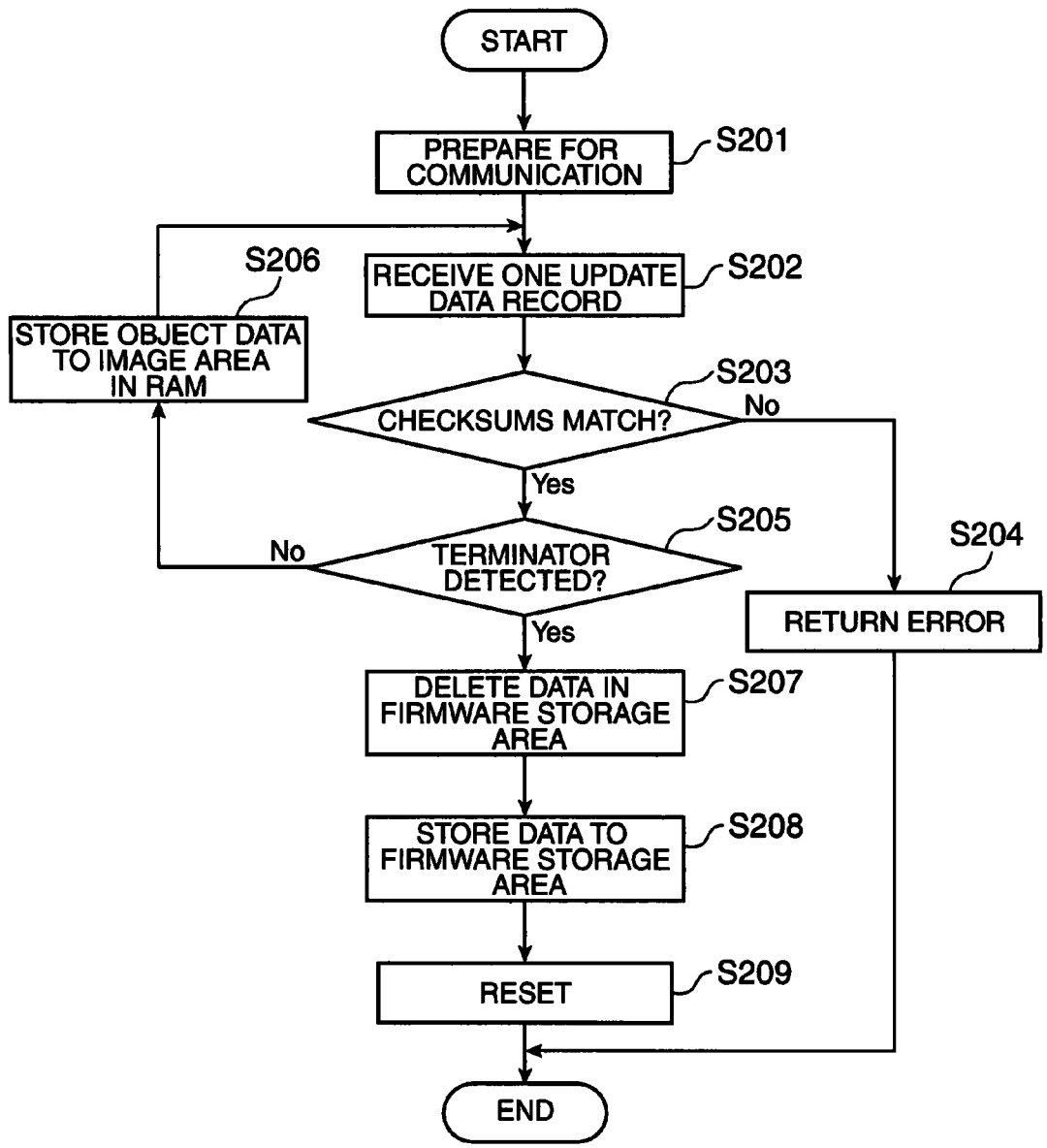
FIG. 5 is a flow chart of the firmware writing process.

The firmware writing process that is run by the printer 13b after receiving firmware update data from the server 12b is described next with reference to the flow chart in FIG. 5.

The printer 13b prepares to receive data (S201) parallel to the server 12b preparing to send data (S111). The printer 13b also initializes the area in RAM 133 where an image of the flash memory is created ("image area" below) to 0xFF. The printer 13b then sequentially reads the SC binary format update data sent from the server 12b one record at a time (S202). The printer 13b then calculates the checksum based on the received data, and determines if the calculated checksum matches the checksum contained in the received record to determine if communication was successful (S203). If the checksums do not match (S203 returns No), the printer 13b returns an error to the server 12b (S204).

If the checksums match and the received record is correct (S203 returns Yes), whether the read record 20c is the SX terminator record is determined (S205). If the received record 20c is not the SX record, the data contained in the data field 34 is written to the image area in the RAM 133 corresponding to the address in the address field 33 (S206). These steps S202 to S206 repeat until all records have been received.

If the read record 20c is the terminator (SX) record (S205 returns Yes), the data in the firmware storage area in the flash memory 132 is erased (S207), and the data stored in the image area in the RAM 133 is written to the firmware storage area in the flash memory 132 (S208). When writing the firmware ends, the printer 13b resets and restarts using the updated firmware (S209). When queried by the server 12b, the printer 13b then returns the firmware version.

Modification of the Update Data Transmission Process

Figure 4:
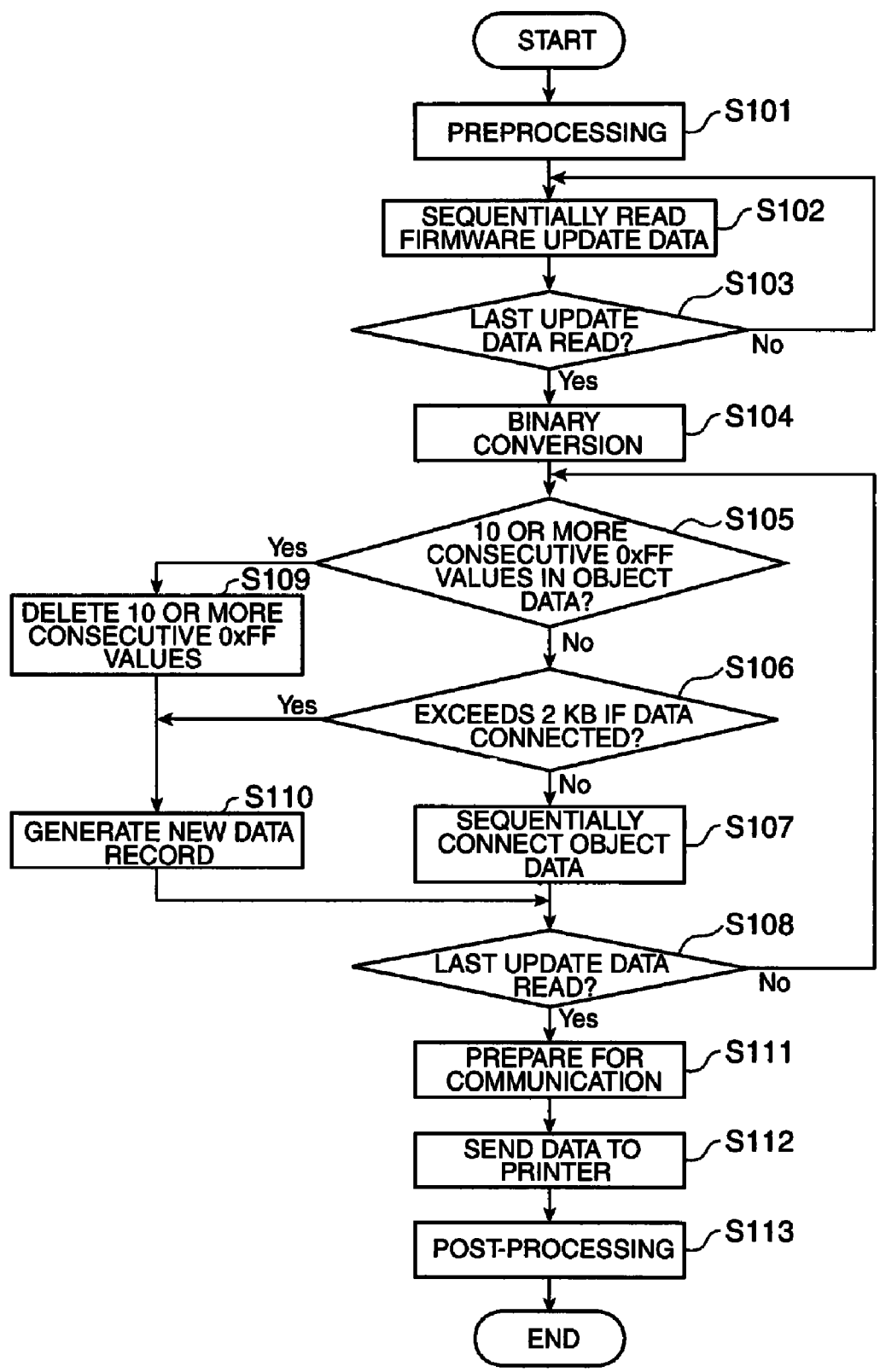
FIG. 4 is a flow chart of the update data transmission process of the present invention according to one aspect of the invention.

The process shown in the flow chart in FIG. 4 first converts the S3 ASCII format data to the S3 binary format, and then converts to the SC binary format, but the S3 ASCII format can first be converted to an SC ASCII format and then converted from the SC ASCII format to the SC binary format. More specifically, the ASCII-to-binary conversion can occur before the S3 format is converted to the SC format, or after the S3 format is converted to the SC format.

Figure 6:
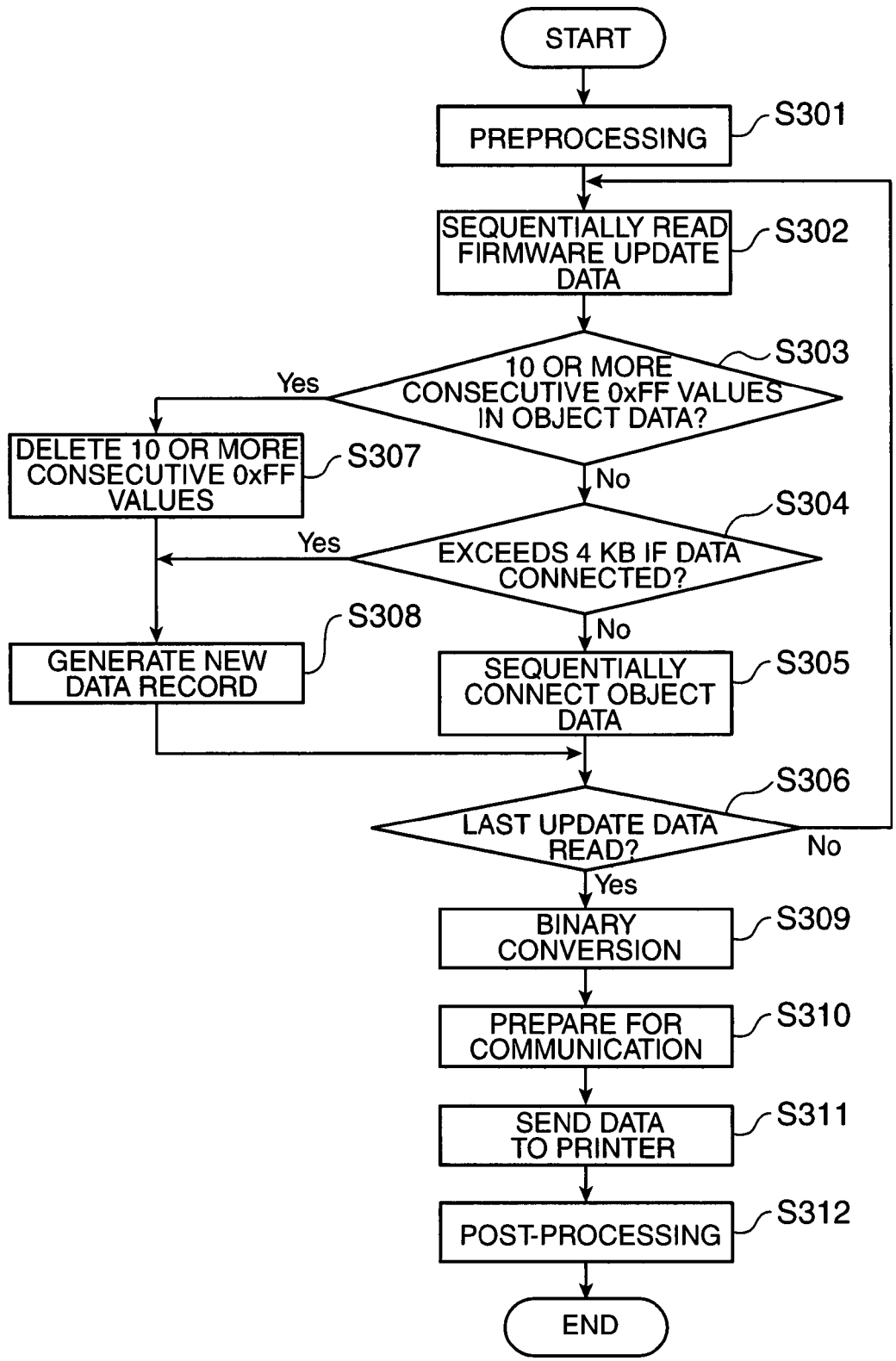
FIG. 6 is a flow chart of the update data transmission process of the present invention according to another aspect of the invention.

The update data transmission process in this latter case is described next with reference to FIG. 6. Further description of steps that are the same in FIG. 4 and FIG. 6 is omitted here. As will be seen from comparing FIG. 4 and FIG. 6, the position of the binary conversion process (steps S309 and S104) within the whole sequence of steps is different. Furthermore, due to this difference in the position of the binary conversion relative to steps (S105-S108 and S303-S306, respectively), the maximum block data length also differs. More specifically, while the maximum block data length is 2 KB in the first embodiment described above (S106), the maximum block data length is 4 KB in this modification (step S304).

The control unit 111 first executes a preprocessing step (S301) and then sequentially reads the firmware update data for the printer 13b in the Motorola S3 format, one record at a time, from the storage unit 112 (S302). Whether a block of 10 or more bytes of consecutive blanks is contained in the object data in the data field 24 is then determined (S303). If there is not a block of 10 or more consecutive blank bytes (S303 returns No), whether the block data length exceeds the maximum block data length (4 KB in this example) is determined (S304). If the block data length does not exceed the maximum block data length of 4 KB (S304 returns No), the data appending unit 111d appends the object data that was just read to the previously read object data (S305). Note that although the firmware update data are read record by record, the appending of the data and the checking of the block data length is performed on a byte by byte basis, to avoid the maximum block data length being exceeded during this appending process. Whether all of the update data has been read, that is, whether the terminator (S7 record) has been read, is then determined (S306), and steps S303 to S306 repeat until the terminator is read. This operation thus reassembles the object data into 4 KB units.

If a block of 10 or more consecutive blank bytes is detected (S303 returns Yes), this block of consecutive blanks is deleted, and the object data preceding the block of blanks is appended to the previously appended object data (S307). The management data is then generated for the object data and added to the object data block to create a new SC ASCII format record 20d (S308).

Note that this SC binary format is a proprietary data format of Seiko Epson Corporation that expands the object data length of the S3 ASCII format to 4 KB, and includes a 2-byte type field 36 (SC), a 4-byte data length field 37 including high bytes 37a and low bytes 37b, an 8-byte address field 38, a maximum 4-KB data field 39, and a 2-byte checksum field 40.

If the block data length exceeds 4 KB in step S304 (S304 returns Yes), the management data is created based on the object data block formed so far (of 4 KB) and added to the object data block to generate an SC ASCII format record 20d (S309).

If step S306 determines that the update data was read to the end (S306 returns Yes), the train of SC ASCII format records 20d is converted to a train of SC binary format records corresponding to records 20c (S309). When the binary conversion ends, the server 12b prepares for communication with the printer 13b (S310) and then sends the train of SC binary format records 20c to the printer 13b (S311).

When the server 12b finishes sending the update data, the server 12b waits until the printer 13b has finished the firmware updating process and then has sent the firmware version to the server, whereupon the server can determine if the firmware was correctly updated (S312).

Alternatively, the invention may be modified to cause the server 12b to run the entire process from compiling the source code of the firmware written in a programming language, generating the S3 ASCII format data, converting the S3 ASCII format data to SC binary format data, and sending the SC binary format data to the peripheral device. Further alternatively, the host computer 11 can run the same process and send the binary format data through the server 12b to the printer 13b.

The peripheral device updates the firmware by overwriting all sectors storing the firmware in a single batch operation, but the firmware can alternatively be overwritten sector by sector.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A method for transmitting firmware update data from a host device to a peripheral device, the method comprising steps of:
   sequentially reading first data records of the firmware update data to be transmitted, each first data record being in a text format and including first object data in said text format and first management data in said text format, said first object data being in a first data field within said first record and consisting of data to be written to said peripheral device, said first management data including a first type code field indicative of the record format of said first data record, a first data length field indicative of the amount of data that follows in the rest of the first data record and a first address field indicative of the memory address within the periphery device corresponding to the first byte of said first object data;
   converting the first object data in the read first data records to corresponding second object data having a binary format;
   sequentially processing said first data records in their read sequence, wherein the processing of said first data records includes the following sub-steps:
      (a) creating a new object data block by consecutively appending second object data corresponding to first object data of the sequential first data records, wherein the appending of second object data to the newly created object data block ceases in response to detecting a group of consecutive null data in the sequential first data records, said group of consecutive null data being defined by a predefined minimum number of consecutive null data;
      (b) in response to detection of any first data record still awaiting completion of processing, discarding all consecutive null data up to the next non-null data in the first object data of the sequential first data records and returning to sub-step (a);
   for each created object data block, defining a corresponding second data record of firmware update data, each second data record including second management data, each second data record having a second data field holding the second object data of its corresponding object data block in said binary format, said second management data including a second type code field in said text format indicative of the record format of said second data record, a second data length field in said binary format indicative of the amount of data that follows in the rest of the second data record, and a second address field in said binary format indicative of the memory address within the periphery device corresponding to the first byte of said second object data; and
   transmitting the second data records from the host device to the peripheral device.

2. The method of claim 1, wherein the group of consecutive null data spans multiple consecutive first data records.

3. The method of claim 1, wherein in sub-step (a) the appending of second object data to the newly created object data block also ceases in response to the data size of said newly created object data block growing to a predefined maximum size.

4. The method of claim 1, wherein:
   said text format consist of only printable characters; and
   said binary format lacks any printable characters.

5. The method of claim 1, wherein the bit-size of each second object data in said binary format is half the bit-size of its corresponding first object data in said text format.

6. The method of claim 1, wherein the text format is an ASCII code format, and the binary format is a non-ASCII format.

7. The method of claim 3, wherein said predefined maximum size is not greater than the batch erase/write sector size of a flash memory in the peripheral device.

8. The method of claim 3, wherein said predefined maximum size is set according to the type of interface to which the peripheral device is connected.

9. The method of claim 3, further comprising:
measuring a communication speed between the host device and the peripheral device; and
wherein said predefined maximum size is based on the measured communication speed.

10. The method of claim 1, wherein the consecutive null data within, and consecutively following, said group of consecutive null data are excluded from any object data block.

11. The method of claim 1, wherein the consecutive null data within, and consecutively following, said group of consecutive null data are deleted.

12. The method of claim 1, wherein said second management data further includes a checksum field in said binary format having a checksum value determined for the second data record.

13. The method of claim 1, wherein said text format is a Motorola S-record format.

14. The method of claim 1, further including, following the transmitting of the second data records from the host device to the peripheral device:
updating the firmware in the peripheral device in accordance with the second data records.

15. The method of claim 1, wherein:
said first address field is indicative of the memory address within the periphery device where the first byte of said first object data is to be written; and
said second address field in said binary format is indicative of the memory address within the periphery device where the first byte of said second object data is to be written.

16. The method of claim 1, wherein the processing of said first data record further includes prior to sub-step (a), an initial sub-step of proceeding to sub-step (b) in response to detecting an initial group of consecutive null data in the sequential first data records, said initial group of consecutive null data being defined by said predefined minimum number of consecutive null data.

17. The method of claim 1, wherein said null data is defined as the erase-state of data cells in a flash memory within said peripheral device.

18. A non-transitory recording medium storing a computer program for transmitting firmware update data from a host device to a peripheral device, the computer program containing instructions for:
sequentially reading first data records of the firmware update data to be transmitted, each first data records being in a first format consisting of printable characters and including first object data in said first format and first management data in said first form at said first object data being in a first data field within said first record and consisting of data to be written to said peripheral device, said first management data including a first type code field indicative of the record format of said first data record, a first data length field indicative of the amount of data that follows in the rest of the first data record and a first address field indicative of the memory address within the periphery device corresponding to the first byte of said first object data;
converting the first object data in the read first data records to corresponding second object data having a second format, said second format lacking any printable characters;
sequentially processing said first data records in their read sequence, wherein the processing of said first data records includes the following sub-steps:
(a) creating a new object data block by consecutively appending second object data corresponding to first object data of the sequential first data records, wherein the appending of second object data to the newly created object data block ceases in response to detecting a group of consecutive null data in the sequential first data records, said group of consecutive null data being defined by a predefined minimum number of consecutive null data;
(b) in response to detection of any first data record still awaiting completion of processing, discarding all consecutive null data up to the next non-null data in the first object data of the sequential first data records and returning to sub-step (a);
for each created object data block, defining a corresponding second data record of firmware update data, each second data record including second management data, each second data record having a second data field holding the second object data of its corresponding object data block in said second format, said second management data including a second type code field in said first format indicative of the record format of said second data record, a second data length field in said second format indicative of the amount of data that follows in the rest of the second data record, and a second address field in said second format indicative of the memory address within the periphery device corresponding to the first byte of said second object data; and
transmitting the second data records from the host device to the peripheral device.

19. A host device configured to transmit firmware update data from the host device to a peripheral device, the host device comprising:
one or more processors;
a data reading unit that sequentially reads first data records of the firmware update data to be transmitted, each first data records being in a first format consisting of printable ASCII characters and including first object data in said first format and first management data in said first format, said first object data being in a first data field within said first record and consisting of data to be written to said peripheral device, said first management data including a first type code field indicative of the record format of said first data record, a first data length field indicative of the amount of data that follows in the rest of the first data record and a first address field indicative of the memory address within the periphery device corresponding to the first byte of said first object data;
a data conversion unit that converts first object data in the read first data records to corresponding second object data having a second format, said second format lacking any printable characters;
a data appending unit that sequentially processes said first data records in their read sequence, wherein the processing of said first data records includes the following sub-steps:
(a) creating a new object data block by consecutively appending second object data corresponding to first object data of the sequential first data records, wherein the appending of second object data to the newly created object data block ceases in response to detecting a group of consecutive null data in the sequential first data records, said group of consecutive null data being defined by a predefined minimum number of consecutive null data;
(b) in response to detection of any first data record still awaiting completion of processing, discarding all consecutive null data up to the next non-null data in the first object data of the sequential first data records and returning to sub-step (a); and a record generator that generates, for each created object data block, a corresponding second data record of firmware update data, each second data record including second management data, each second data record having a second data field holding the second object data of its corresponding object data block in said second format, said second management data including a second type code field in said first format indicative of the record format of said second data record, a second data length field in said second format indicative of the amount of data that follows in the rest of the second data record, and a second address field in said second format indicative of the memory address within the periphery device corresponding to the first byte of said second object data; and a communication interface that sends the second data records from the host device to the peripheral device.

20. A firmware writing system, comprising:

a host device and a peripheral device in communication with the host device, the host device being configured to transmit firmware update data to the peripheral device;

wherein the host device comprises:

a data reading unit that sequentially reads first data records of the firmware update data to be transmitted, each first data records being in a first format consisting of printable ASCII characters and including first object data in said first format and first management data in said first format, said first object data being in a first data field within said first record and consisting of data to be written to said peripheral device, said first management data including a first type code field indicative of the record format of said first data record, a first data length field indicative of the amount of data that follows in the rest of the first data record and a first address field indicative of the memory address within the periphery device corresponding to the first byte of said first object data;

a data conversion unit that converts first object data in the read first data records to corresponding second object data having a second format, said second format lacking any printable characters;

a data appending unit that that sequentially processes said first data records in their read sequence, wherein the processing of said first data records includes the following sub-steps:
(a) creating a new object data block by consecutively appending second object data corresponding to first object data of the sequential first data records, wherein the appending of second object data to the newly created object data block ceases in response to detecting a group of consecutive null data in the sequential first data records, said group of consecutive null data being defined by a predefined minimum number of consecutive null data;
(b) in response to detection of any first data record still awaiting completion of processing, discarding all consecutive null data up to the next non-null data in the first object data of the sequential first data records and returning to sub-step (a); and a record generator that generates, for each created object data block, a corresponding second data record of firmware update data, each second data record including second management data, each second data record having a second data field holding the second object data of its corresponding object data block in said second format, said second management data including a second type code field in said first format indicative of the record format of said second data record, a second data length field in said second format indicative of the amount of data that follows in the rest of the second data record, and a second address field in said second format indicative of the memory address within the periphery device corresponding to the first byte of said second object data; and a communication interface that sends the second data records from the host device to the peripheral device wherein the peripheral device comprises:

a flash memory;

a reception unit that receives the firmware update data comprised of the second records; and a writing unit that rewrites the received firmware update data into said flash memory.

* * * * *

UNITED STATES PATENT AND TRADEMARK OFFICE
CERTIFICATE OF CORRECTION

| | | |
|---|---|---|
| PATENT NO. | : 8,255,894 B2 | Page 1 of 1 |
| APPLICATION NO. | : 11/881687 | |
| DATED | : August 28, 2012 | |
| INVENTOR(S) | : Masayuki Nakagawa et al. | |

It is certified that error appears in the above-identified patent and that said Letters Patent is hereby corrected as shown below:

Column 13,

Line 55, please change "records" to --record--

Column 13,

Line 58, please change "form at" to --format-- and

Column 16,

Line 5, please change "that that" to --that--

Signed and Sealed this
Twenty-seventh Day of November, 2012

David J. Kappos
*Director of the United States Patent and Trademark Office*